US006171382B1

(12) United States Patent
Stübbe et al.

(10) Patent No.: US 6,171,382 B1
(45) Date of Patent: Jan. 9, 2001

(54) AQUEOUS CARBON BLACK DISPERSIONS

(75) Inventors: Andreas Stübbe, Aschaffenburg; Horst Kleinhenz, Grosskrotzenburg; Jürgen Leimann, Frankfurt; Alfons Karl, Gründau, all of (DE)

(73) Assignee: Degussa-Huls AG, Frankfurt am Main (DE)

( * ) Notice: Under 35 U.S.C. 154(b), the term of this patent shall be extended for 0 days.

(21) Appl. No.: 09/325,548

(22) Filed: Jun. 4, 1999

(30) Foreign Application Priority Data

Jun. 4, 1998 (DE) ................................. 198 24 947

(51) Int. Cl.[7] .................................................. C09D 11/00
(52) U.S. Cl. .................. 106/31.9; 106/31.89; 106/31.86; 106/472
(58) Field of Search ................. 106/31.9, 31.89, 106/31.86, 472, 476

(56) References Cited

U.S. PATENT DOCUMENTS 4,530,961 * 7/1985 Nguyen et al. ................... 106/31.75
5,538,548   7/1996 Yamazaki .
5,542,969 * 8/1996 Hirasa et al. ........................ 106/472
5,736,606 * 4/1998 Yanagi et al. ........................ 524/547

FOREIGN PATENT DOCUMENTS

| 196 54 752 A1 | 7/1997 | (DE) . |
| 0 704 503 A1 | 4/1996 | (EP) . |
| 0 805 191 A2 | 11/1997 | (EP) . |
| 0 805 191 A3 | 11/1997 | (EP) . |

* cited by examiner

*Primary Examiner*—Mark L. Bell
*Assistant Examiner*—Veronica F. Faison
(74) *Attorney, Agent, or Firm*—Pillsbury Madison & Sutro LLP

(57) ABSTRACT

Aqueous carbon black dispersions contain carbon black and surfactants, in addition to water. The dispersions are produced by dispersing the carbon black and the other constituents in water, using bead mills, ultrasonic mills and/or an ultra-turrax. The aqueous carbon black dispersions can be used to produce printing inks such as ink-jet inks or writing inks.

15 Claims, No Drawings

AQUEOUS CARBON BLACK DISPERSIONS

CROSS-REFERENCE TO RELATED APPLICATION

This application is related to German Application DE 198 24 947.0, filed Jun. 4, 1998, which disclosure is incorporated herein by reference.

FIELD OF THE INVENTION

The invention relates to aqueous carbon black dispersions, a method of their production and use.

BACKGROUND OF THE INVENTION

Aqueous carbon black dispersions are used in producing printing inks and are also used directly as inks, e.g., in ink-jet printers.

The ink-jet printing process is a known duplicating technology in which the printing ink is transferred in a contactless manner, that is, without contact of the printing head with the print medium. Ink drops are sprayed from a jet onto a receiving material, during which their deflection can be electronically controlled. This technology, also designated as contactless printing, is particularly suited for printing products with irregular surfaces and packages because there is a certain distance between the printing head and the matter to be printed.

The printing process is very flexible and relatively economical and is therefore also used in computer printing, e.g., in a workplace printer. The ink-jet printing process is also being increasingly used in the industrial area, e.g., in outdoor advertising. In outdoor advertising the ink must meet special requirements of resistance to light and to water. In addition, the ink components must be very finely divided so that the printer jets do not become clogged. Dyes, colorants, and, recently, even pigments are being used as color-causing substances.

Pigments have the advantage over dyes that their resistance to light is very high and that they are water-resistant. Pigments have a disadvantage compared to dyes in that they form stable dispersions with a high storage stability only by means of treatment with surface-active substances (surfactants). Pigment particles are not present in the form of primary particles but rather in the form of aggregates. Pigment aggregates are larger than soluble dyes. If pigment aggregates are not sufficiently finely dispersed they clog the jets of the printing head. In addition, large aggregates alter the light-absorption properties of the pigment black. A graying of the printing and a loss of covering power and opacity results.

A description of pigment blacks in ink-jet printer inks are found in U.S. Pat. No. 5,085,698 and U.S. Pat. No. 5,320,668. These patents describe the use of water-soluble acrylates for pigment stabilization.

The production of aqueous carbon black dispersions with carbon black having an average primary particle size of not greater than 30 nm and a DBP number of at least 75 ml/100 g is known (U.S. Pat. No. 5,538,548).

The production of aqueous carbon black dispersions using water-soluble, organic solvent and water-soluble acrylic resins is also known (U.S. Pat. No. 5,609,671).

The known aqueous carbon black dispersions have the following disadvantages:

The obtainable optical densities are comparatively low.

The abrasion resistance is poor (see reference examples A, B and C).

Therefore, the object of the invention is to produce carbon black dispersions which do not have these disadvantages.

SUMMARY OF THE INVENTION

The invention provides aqueous carbon black dispersions containing the following components in addition to water:

Carbon Black: 1 to 40% by weight, preferably 3 to 20% by weight,

Surfactant: 1 to 30% by weight, preferably 2 to 15% by weight.

Nonionic and/or anionic wetting agents can be used as surfactants.

The following are suitable nonionic surfactants: cross-linked polyoxyethylene acrylic acid (e.g. HYPERMER CG 6), fatty alcohol ethoxylate with 30 units of ethylene glycol (e.g. LUTENSOL AO 30).

Lignin sulfonates, alkyl benzene sulfonates, naphthalenesulfonic acid derivatives, etc. can be used as anionic surfactants.

In a preferred embodiment the dispersion can contain a combination of two nonionic wetting agents.

In a preferred embodiment of the invention, a combination of a) a cross-linked polyoxyethylene acrylic acid, and b) an alkoxyethylate, preferably a fatty acid ethoxylate, especially a fatty alcohol ethoxylate with 30 ethylene glycol units, can be used as surfactant, in which the ratio of the surfactants b : a can be 1:2 to 1:10.

An increase in the rise of the viscosity of the dispersions during storage can be prevented by the further addition of an anionic wetting agent such as, e.g., lignin sulfonates, alkyl benzene sulfonates or naphthalenesulfonic acid derivatives. The carbon black dispersions can contain an anionic wetting agent, preferably a lignin sulfonate and/or a cationic wetting agent in addition to the nonionic wetting agents.

Pigment blacks with an average primary particle diameter of 8 to 80 nm, preferably 10 to 35 nm, and a DBP number of 40 to 200 ml/100 g, preferably 60 to 150 ml/100 g, can be used as the carbon black. In a preferred embodiment of the invention, gas blacks with an average primary particle diameter of 8 to 30 nm, preferably 10 to 25 nm, canbe used.

The invention further includes a method of producing an aqueous carbon black dispersion in which bead mills, ultrasonic mills and/or an ultra-turrax are used for dispersing the carbon black. The carbon black dispersion can be centrifuged following the dispersal.

The pH of the dispersions constituting the subject matter of this invention is in the basic range, preferably in a range of 8–10.

The dispersions in accordance with the invention have a very high flocculation stability and therewith a high storage stability. The aggregate size does not exceed 160 nm. The average particle size of the carbon black aggregates present in the dispersion is approximately 60–100 nm. TEM photographs show that this aggregate size remains the same even after drying. This is not the case in reference examples A, B and C. Rather, a distinct agglomeration occurs. The agglomerates do not allow the pigment black to develop its full covering power. The printing therefore has low optical density and a distinct gray tone. In contrast thereto, the dispersions in accordance with the invention display a high covering power which stems from the small aggregate sizes. The carbon black dispersions of the invention improve the printing quality and the water resistance of ink-jet inks produced using these dispersions. Printing using ink-jet inks containing dispersions made with gas black in accordance with the invention display especially high optical densities without gray tone and are therefore particularly suited for being used in ink-jet inks or in writing inks. The black dispersions of the invention advantageously display a higher optical density than known black dispersions.

As a result of the higher optical density, the printed image in four-color printing becomes more brilliant and sharper. The written image and, therefore, the legibility is improved in black-and-white printing by virtue of the higher contrast.

The aqueous black dispersions of the invention can be used to produce printing inks, ink-jet inks and writing inks.

DETAILED DESCRIPTION OF THE PREFERRED EMBODIMENT

EXAMPLES

Carbon black dispersions in accordance with the invention are produced as follows:

1. Preparation of the wetting-agent solution a) Water is placed in a receiver and LUTENSOL AO 30 is dissolved therein with heating to at the most 60° C. After cooling off the mixture, the appropriate amounts of HYPERMER CG6 and AMP 90 or amine are added while agitating.

b) Distilled water is placed in the dispersion receiver and LUTENSOL AO 30 is slowly added with the ultra-turrax running (without cooling). Heating above 60° C. must be avoided. The other components are added after complete dissolution of the LUTENSOL.

2. Working in the carbon black

Gradually, the carbon black is worked into the prepared wetting-agent solution using slow agitation (either by hand or with a slowly agitating mechanism).

3. Dispersal a) Ultra-turrax

The dispersion prepared in paragraph 2, above, is dispersed using the ultra-turrax at stage 10 (highest stage). Very coarse particles can be separated in a centrifuge from the dispersion obtained in this manner.

b) Bead mill

The solution prepared in paragraph 2 (above) is homogenized using an ultra-turrax—in order to avoid clogging the pump—and then dispersed using the bead mill, in two steps. Settings of the amount of flowthrough and the speed of the bead mill are variable. Suitable conditions are 3–4 l/h flowthrough amount, at a speed of 3000 rpm. Subsequently, the dispersion is passed through a sieve with a mesh width of 100 $\mu$m. If there are any bead breaks, the remnants remain on the sieve, and then the liquid portion is centrifuged at 4000 rpm.

The composition of the aqueous carbon black dispersions as well as their properties are shown in Table 1.

TABLE 1

| Example No. Dispersal: FRYMA mill | 1 | 2 | 3 | 4 | 5 | 6 | 7 | 8 | A* | B* | C* |
|---|---|---|---|---|---|---|---|---|---|---|---|
| Constituents | | | | | | | | | | | |
| PRINTEX 90 | | | | | | | | 15 | | | |
| Color black S 160 | | | | | | | 15 | | | | |
| Color black FW 18 | 15 | 15 | 15 | 15 | 15 | 15 | | | | | |
| LUTENSOL AO 30 | 9 | 4.5 | 4.5 | 6 | 8 | 7.5 | 6 | 5.5 | | | |
| VANISPERSE CB | | | | | | 0.4 | | | | | |
| HYPERMER CG 6 | 3 | 1.5 | 1.5 | 2 | | 2.1 | 2 | 1.8 | | | |
| AMP 90 | 0.2 | 0.1 | 0.3 | 0.3 | 0.3 | 0.3 | 0.3 | 0.1 | | | |
| Water | 72.8 | 78.9 | 78.7 | 76.7 | 76.7 | 74.7 | 76.7 | 77.6 | | | |
| Total | 100 | 100 | 100 | 100 | 100 | 100 | 100 | 100 | | | |
| Surface tension mN/m | 42 | | | | | | | 46 | 53 | 73 | 71 |
| Average particle size nm | 104 | | 104 | 116 | | 87 | 125 | 77 | 100 | 44 | 90 |
| Optical density (5% black/15% TEG) | 1.55 | | | 1.55 | | 1.55 | 1.65 | 1.45 | 1.4 | 1.2 | 1.46 |
| pH | 9.4 | 7.7 | 9.5 | 9.9 | | 8.8 | 9.8 | 6.8 | | | |
| Stability | | | | | | | | | | | |
| Very good | | | | | | X | | X | | | |
| Good | | | | X | | | X | | X | X | X |
| Average | X | | X | | | | | | | | |
| Poor | | X | | | X | | | | | | |

A, B and C are reference examples

The surface tension is determined by the plate method according to DIN 53 914 (3/80) at 20° C.

The average particle size (nm) is determined by photon correlation spectroscopy.

The optical density is determined with a Mcbeth RD 918 densitometer on test prints produced on a Hewlett Packard 660 C printer.

The pH is determined directly in the black dispersion with a commercial measuring electrode.

The stability test is carried out as follows:

The dispersion is stored for 35 days at 50° C., then frozen to −30° C. and heated to 70° C.

In the evaluation, the following criteria were used:

Very good: without sedimentation and without a rise of viscosity

Good: without sedimentation or flocculation

Average: distinct rise of viscosity, reversible

Poor: the dispersion gels or flocculation occurs.

The concentration of wetting agent is varied in Examples 1 to 4. The pigment black used is a gas black with an average primary particle size of 15 nm. In Example 1, too much dispersing agent is used and in Examples 2 and 3, too little dispersing agent is used. The optimum is achieved in Example 4 with a total of 8% dispersing agent. The ratio of wetting agents LUTENSOL AO 30 to HYPERMER CG 6 is 3:1. In Example 2, the pH is dropped below 8 and flocculation occurs. In Example 5 only one wetting agent is used. The stabilization is not sufficient and flocculation also occurs. In Example 6, an anionic dispersing agent is used in addition to LUTENSOL AO 30 and HYPERMER CG 6. The stability of this dispersion is very good. In Example 7, a gas black with an average primary particle size of 20 nm is used. The optical density is particularly high when this type of black is used. In Example 8, a furnace black with an average primary particle size of 14 nm and a DBP adsorption of 95 ml/100 g is used. A comparatively low optical density is achieved with this type of black. Reference examples A, B and C are carried out with commercial inks and dispersions. The optical densities do not achieve the same level of the inks produced with the dispersions of the invention. The reason for this lies in the previously mentioned strong agglomeration of the blacks during drying.

The components used in the production of the black dispersions are characterized as follows:

PRINTEX 90 black is a furnace black with an average primary particle size of 14 nm and a DBP adsorption of 95 ml/100 g.

Color black S 160 is a gas black with an average primary particle size of 20 nm.

Color black FW 18 is a gas black with an average primary particle size of 15 nm.

LUTENSOL AO 30 is a nonionic wetting agent (supplier: BASF),

Nonionic wetting agents are, for example, alkylethoxylate, fatty alcohol ethoxylate or fatty alcohol ethoxylate with 30 units of ethylene glycol. VANISPERSE CB is an anionic wetting agent (supplier: Lignotech). HYPERMER CG 6 is a nonionic wetting agent consisting of cross-linked polyoxyethylene acrylic acid (supplier: ICI). AMP 90 is an amine (supplier: Angus Chemie).

What is claimed is:

1. Aqueous carbon black dispersion comprising, in addition to water, the following components:

carbon black 1 to 40% by weight; and surfactant 1 to 30% by weight;

wherein the surfactant comprises a wetting-agent combination including non-ionic wetting agent and at least one member selected from the group consisting of anionic wetting agents and cationic wetting agents.

2. The aqueous carbon black dispersion according to claim 1, wherein the dispersion contains a pigment black having an average primary particle size of 8 to 80 nm and a DBP number of 40 to 200 ml/100 g.

3. The aqueous carbon black dispersion according to claim 1, wherein the dispersion comprises a gas black having an average primary particle size of 8 to 30 nm.

4. The aqueous carbon black dispersion according to claim 1, wherein the wetting-agent combination comprises two nonionic wetting agents.

5. An aqueous carbon black dispersion comprising, in addition to water, the following components:

carbon black 1 to 40% by weight; and surfactant 1 to 30% by weight:

wherein the surfactant comprises a nonionic wetting agent combination comprising:

a) a cross-linked polyoxyethylene acrylic acid; and b) an alkylethoxylate.

6. The aqueous carbon black dispersion according to claim 5, wherein the non-ionic wetting agents are used in a ratio b:a=1:2 to 1:10.

7. The aqueous carbon black dispersion according to claim 5, wherein in addition to the nonionic wetting agents, the dispersion comprises at least one member selected from the group consisting of an anionic wetting agent and a cationic wetting agent.

8. A method of producing aqueous carbon black dispersions, according to claim 1 comprising:

using at least one member selected from the group consisting of bead mills, ultrasonic mills and an ultra-turrax for dispersing the carbon black.

9. A method of producing aqueous carbon black dispersions, according to claim 1 comprising:

dispersing the carbon black in water to form an aqueous carbon black dispersion, and centrifuging the aqueous carbon black dispersion.

10. A method of using an aqueous carbon black dispersion according to claim 1 comprising:

producing ink-jet inks or writing inks containing the carbon black dispersion.

11. The dispersion according to claim 2, wherein the pigment black has an average primary particle size of 10–35 nm.

12. The dispersion according to claim 2, wherein the pigment black has a DBP number of 60–150 ml/100 g.

13. The dispersion according to claim 5, wherein the alkylethoxylate comprises a fatty alcohol ethoxylate.

14. The dispersion according to claim 13, wherein the fatty alcohol ethoxylate has 30 ethylene glycol units.

15. The dispersion according to claim 7, wherein the anionic wetting agent comprises a lignin sulfonate.

* * * * *